(12) United States Patent
Shirzadi-Ghoshouni et al.

(10) Patent No.: US 6,257,481 B1
(45) Date of Patent: Jul. 10, 2001

(54) METAL BONDING

(75) Inventors: Amir Abbas Shirzadi-Ghoshouni; Eric Robert Wallach, both of Cambridge (GB)

(73) Assignee: Cambridge University Technical Services Limited, Cambridge (GB)

(*) Notice: Subject to any disclaimer, the term of this patent is extended or adjusted under 35 U.S.C. 154(b) by 0 days.

(21) Appl. No.: 09/423,469

(22) PCT Filed: May 6, 1998

(86) PCT No.: PCT/GB98/01312
§ 371 Date: Nov. 9, 1999
§ 102(e) Date: Nov. 9, 1999

(87) PCT Pub. No.: WO98/50194
PCT Pub. Date: Nov. 12, 1998

(30) Foreign Application Priority Data

May 6, 1997 (GB) .................................................. 9709167

(51) Int. Cl.⁷ ............................ B23K 20/00; B23K 28/00; B23K 31/02

(52) U.S. Cl. ......................... 228/195; 228/178; 228/233.2

(58) Field of Search ..................................... 228/195, 178, 228/233.2

(56) References Cited

U.S. PATENT DOCUMENTS

| 3,678,570 | | 7/1972 | Paulonis ................................ 29/498 |
| 4,026,677 | * | 5/1977 | Galasso et al. ...................... 428/649 |
| 4,225,322 | * | 9/1980 | Knemeyer .............................. 51/295 |
| 5,234,152 | * | 8/1993 | Glaeser ................................ 228/121 |
| 5,322,740 | * | 6/1994 | Ghosh ................................. 428/649 |
| 5,372,298 | * | 12/1994 | Glaeser ................................ 228/195 |
| 5,664,723 | * | 9/1997 | Sastri ................................ 228/124.1 |

* cited by examiner

Primary Examiner—Tom Dunn
Assistant Examiner—Zidia Pittman
(74) Attorney, Agent, or Firm—Sughrue, Mion, Zinn, Macpeak & Seas, PLLC

(57) ABSTRACT

A method of bonding two pieces of metal having a foil or layer of another metal, either of lower melting point or such that it forms a liquid layer at or near to the bonding temperature, disposed therebetween. The method comprises the steps of: bringing the pieces into contact; applying pressure across the area of contact; heating the area of contact; and providing a predetermined temperature gradient across the area of contact.

6 Claims, 1 Drawing Sheet

METAL BONDING

The present invention relates to metal bonding and, in particular to the formation of bonds using a new variant of transient liquid phase (TLP) diffusion bonding.

TLP diffusion bonding is performed by bringing together, generally under pressure, surfaces of a metal to be bonded, with an interlayer of a material disposed in between the surfaces, and heating the area of contact. Typically, the interlayer material between the metal substrates forms a liquid layer at the bond line during joining and subsequently solidifies isothermally as a consequence of interdiffusion with the metal substrates, this all taking place principally at the bonding temperature.

It is desirable that the mechanical properties, e.g. shear strength, of a bond are comparable to those of the parent material, but this is difficult to achieve for many materials. For example, the presence of a tenacious and chemically stable layer of aluminium oxide on the surface of aluminium based alloys and composites has prevented the production of reliable bonds in these materials by conventional TLP diffusion bonding. Although the formation of the liquid phase in conventional TLP diffusion bonding leads to disruption of the oxide layer, some of the oxide particles may agglomerate in the bond line, so causing joint weakness.

The problem is increased by the random distribution of oxide particles in a joint with a planar interface, which causes inconsistency in the mechanical strengths of the bonds.

According to the present invention there is provided a method of bonding two pieces of metal having a foil or layer of another metal, either of lower melting point or such that it forms a liquid layer at or near to the bonding temperature, disposed therebetween, the method comprising steps of:

bringing the pieces into contact;

applying pressure across the area of contact;

heating the area of contact; and providing a predetermined temperature gradient across the area of contact.

Preferably the temperature gradient is such that a bond of sinusoidal profile is formed.

The method may be of benefit in joining many metals and their alloys, and metal matrix composites, by TLP diffusion bonding, including aluminium and its alloys, nickel and its alloys.

The method of bonding of the present invention may also comprise a step of applying a coating to one or more of the contact surfaces. This coating may be applied by sputtering, electrodeposition or other similar approaches.

As an example, when the material is Al—Mg—Si alloy 6082 a suitable temperature gradient is 10° C./mm, a suitable joint temperature is 545° C., a suitable pressure to apply to the joint is 1 MPa and a suitable coating is copper at a thickness of 1.5 $\mu$m.

Also according to the present invention there is provided an apparatus for bonding two pieces of metal having a layer of another metal, either of lower melting point or such that it forms a liquid layer at or near to the bonding temperature, disposed therebetween, the apparatus comprising:

means for bringing the two pieces into contact;

means for applying pressure to the area of contact;

means for heating the area of contact; and means for providing a predetermined temperature gradient across the area of contact.

An example of the invention will now be described with reference to the accompanying drawings, in which.

Figure 1:
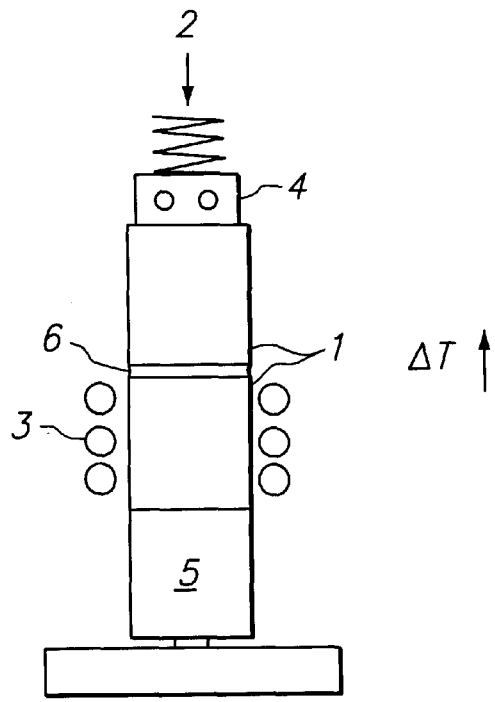
FIG. 1 is a schematic diagram of an apparatus according to the invention.

Referring to FIG. 1 two blocks 1 of, in this example, aluminium alloy are placed one on top of the other on an insulating block 5. A layer of metal, either of lower melting point than that of the blocks or such that it forms a liquid layer at or near to the bonding temperature, is provided between the blocks. In this instance a copper layer is applied to the contact surface of one of the blocks by sputtering, but it can be appreciated that there are many other suitable means of providing an intermediate layer.

A downward pressure is exerted on the blocks 1 by the load 2, holding them together and applying pressure to the contact 6 between the blocks 1. An induction coil 3 heats the blocks 1, and a water cooled heat sink 4 removes heat from the top of the upper block 1, forming a temperature gradient $\Delta T$.

The temperature gradient $\Delta T$ may be changed by either varying the capacity of the heat sink 4 or, more practically, by using the induction coil 3 to vary the temperature of the lower block 1 whilst the temperature of the upper block 1 remains constant.

Figure 2:
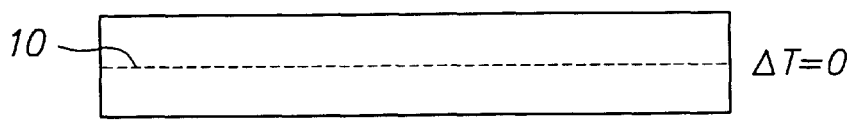
FIG. 2 is a schematic diagram of the cross-section of a bond formed with conventional TLP bonding with no generated temperature gradient.
Figure 3:
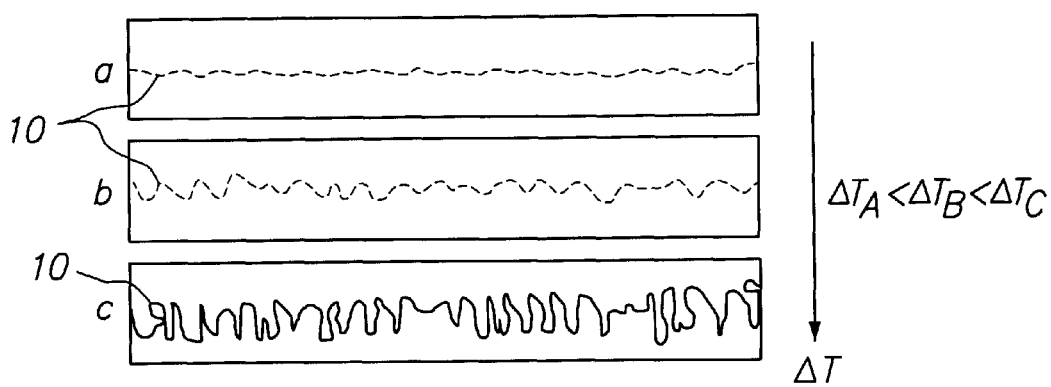
FIG. 3 is a schematic diagram of the cross-sections of bonds formed according to the invention with different temperature gradients.

The temperature gradient $\Delta T$ has a significant effect on the resulting microstructure of the bond 10 produced at the contact 6. Without a temperature gradient a bond 10 formed by TLP diffusion bonding is planar, as illustrated FIG. 2. The higher the temperature gradient $\Delta T$ that is applied, the more the microstructure of the bond 10 produced departs from being planar. Applying a small temperature gradient $\Delta T$a creates a sinusoidal bond microstructure as illustrated in FIG. 3, section a. A larger temperature gradient $\Delta T$b creates a cellular bond microstructure as illustrated in FIG. 3, section b. An even larger temperature gradient $\Delta T$c creates a fully dendritic bond microstructure as illustrated in FIG. 3, section c.

It has been found that a sinusoidal or cellular bond microstructure results in a bond having a shear strength comparable to the shear strength of the parent material having undergone the same thermal cycle. For example with blocks of Al—Mg—Si alloy 6082, a temperature gradient of 10° C./mm adjacent to the joint, the hotter block at a temperature of 545° C., a coating of copper applied by sputtering of thickness 1.5 $\mu$m and an applied pressure of 1 MPa, a bond with a shear strength equal to that of the parent material can be formed.

The strength of this type of bond may be due to the increased surface area of the interface between the two blocks of material. With aluminium alloys the aluminium oxide layer is brittle, so breaks as it cannot be deformed leading to a greater metal to metal contact area, and hence stronger bonds.

A dendritic microstructure is not desirable as there is may be associated void formation between the dendrites and consequently, in such casess, the shear strengths of the bonds are likely to be low.

It should be noted that as well as the specific materials cited above to demonstrate the principle of TLP diffusion bonding in a temperature gradient, namely aluminium and its alloys and composites, such as Al-6082, UL40, and AL-359, this method may be of benefit when joining nickel and nickel alloys as well as any other metals and their alloys, and metal matrix composites. and their alloys by TLP diffusion bonding.

What is claimed is:

1. A method of bonding two pieces of metal having a foil or layer of another metal, either of lower melting point or such that it forms a liquid layer at or near to the bonding temperature, disposed therebetween, the method comprising steps of:

applying a coating to one or more contact surfaces;

bringing the pieces into contact;

applying pressure across the area of contact;

heating the area of contact; and providing a predetermined temperature gradient across the area of contact.

2. A method according to claim 1, wherein the temperature gradient is such that a bond of sinusoidal profile is formed.

3. A method according to claim 1, wherein the coating is applied by sputtering.

4. A method according to claim 1, wherein the method is applied to aluminium or one of its alloys.

5. A method according to claim 1, wherein:

the metal is Al—Mg—Si alloy 6082;

the temperature gradient is around 10° C./mm;

a joint temperature is around 535° C.;

the pressure applied to the joint is around 1 MPa; and the coating is copper at a thickness of around 1.5 $\mu$m.

6. A method according to claim 1, wherein the method is applied to nickel or one of its alloys.

* * * * *